FIG. I.

United States Patent Office 3,470,407
Patented Sept. 30, 1969

3,470,407
CONCENTRIC COIL WINDINGS FOR THREE-SPEED, SINGLE-PHASE INDUCTION MOTOR STATOR
Benjamin F. Richer and Thomas Charlton, Lima, Ohio, assignors to Westinghouse Electric Corporation, Pittsburgh, Pa., a corporation of Pennsylvania
Filed May 20, 1968, Ser. No. 730,571
Int. Cl. H02k 19/06
U.S. Cl. 310—166                    6 Claims

ABSTRACT OF THE DISCLOSURE

A concentric coil winding arrangement for a single-phase induction motor comprising at least three main windings disposed in the slots of an existing two-speed stator core to provide magnetic poles for at least three running speeds, the third winding and a portion of the first winding being electrically connected together and disposed in a manner to induce in the core additional magnetic poles for the third running speed when the third winding and the portion of the first are energized.

Background of the invention

Two-speed, single-phase induction motors have become relatively plentiful because of the demand for such motors created by apparatus and household appliances (for example, washing machines) requiring at least two running speeds for proper operation.

Generally, such motors use a stator core built up of laminations or punchings having slots supporting first and second main windings, each formed of a number of concentric coils, the first winding providing a first number of primary magnetic running poles for operating the motor at high speed, and the second winding providing a greater number of primary poles for low speed operation.

Two-speed stator cores, and laminations forming such cores, have become essentially standardized in the industry, the dies for punching the laminations and the automatic winding machinery for inserting the coils in the cores being in general use throughout the industry.

There is presently needed, however, three-speed single-phase induction motors for apparatus and appliances in which the amount of space available for the motor is substantially same as before. Thus, a third winding comprising a plurality of concentric coil groups for forming a third number of running poles is needed but is not easily attainable using a stator core having a size similar to that of a two-speed machine. To redesign the stator core and laminations for three-speed operation would be a costly process since dies for punching the laminations and the automatic machinery for inserting the concentric coils would have to be designed and built. Further, any reduction in the width of the core slots would increase the difficulty of the coil inserting process as well as enhancing the possibility of shorting the coil turns.

Brief summary of the invention

The invention comprises a winding arrangement for a single-phase motor in which three-speed windings are conveniently and economically disposed in the slots of existing stator laminations designed to accommodate only two-speed windings. This is accomplished by using inner sections of a first speed winding in combination with a symmetrically located third speed winding to induce in the lamination two additional magnetic poles for the third speed operation, the use of the first speed inner winding sections for third speed operation allowing fewer turns of wire for third speed coils, thereby providing room in standard two-speed cores for such coils. In this manner, the stator core or lamination of a two-speed machine can be used to provide an economic three-speed machine without an attendant increase in the physical size of the machine (the increase in core length being less than required for a conventional three-speed winding), the use of the two-speed core eliminating the costs of redesigning a core as well as the costs of new dies for punching core laminations. Further, no new automatic machinery is required for inserting the three-speed windings in the core since the windings of the present invention are symmetrically arranged therein. The windings for the first and second speeds and the start winding are wound and arranged in the core in the manner standard for the core.

It should be further noted that since a substantial portion of the four pole coil wire is employed for use in eight pole operation, a considerable saving in coil wire is made possible with the invention. Similarly, with the present invention, only ten coils are required for eight pole operation compared to the twelve coils normally required. This reduces winding time and labor costs which are proportional to the number of coils handled.

The drawings

The invention, with its attendant advantages and objects, will be better understood upon consideration upon consideration of the following detailed description read in connection with the accompanying drawings in which.

Preferred embodiment

Figure 1:
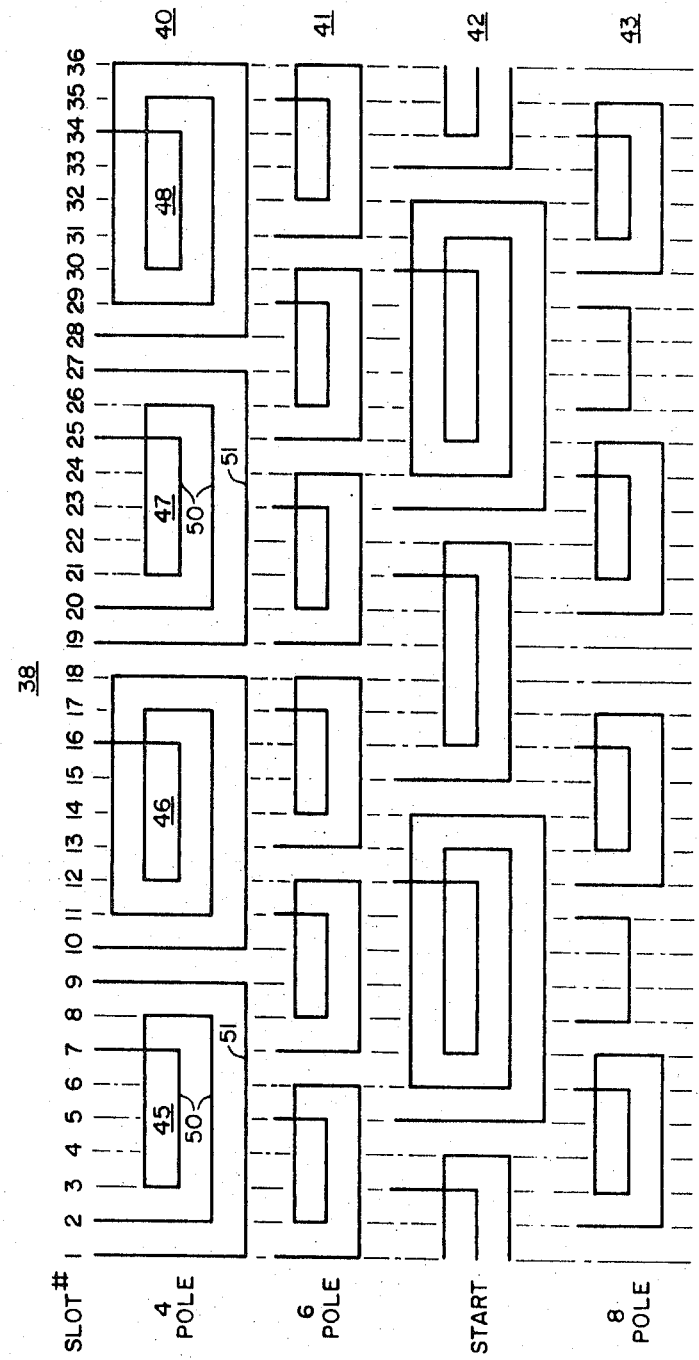
FIG. 1 is a diagrammatic developed view of a stator core and windings in a typical embodiment of the invention.

Specifically, in FIG. 1 of the drawings there is shown a diagrammatic developed view of a stator core 38 having thirty-six slots indicated by vertical lines numbered 1 to 36 inclusive. A plurality of windings are disposed in the slots, each of the windings comprising a plurality of concentric coils disposed in spaced pole groups and generally designated 40 through 43. Each coil has a suitable number of turns and the windings are wound successively in the same slots although they are shown separated for clarity of illustration. The connections between the pole groups of each winding are shown in FIG. 2 but have been omitted in FIG. 1 to void undue complication thereof.

The winding 40 is a main primary winding for a first running speed and thus may be considered as the first primary winding consisting of four pole groups 45 through 48 each of which is comprised of a plurality of concentric coils wound in the slots of the core 38 in the usual manner. Two alternate ones of the concentric coils, however, coils 45 and 47 for example, include inner and outer sections or portions 50 and 51 respectively, the inner and outer portions and the other two coils 46 and 48 being connected together (FIG. 2) to form magnetic poles of alternate polarity in the usual manner.

Figure 2:
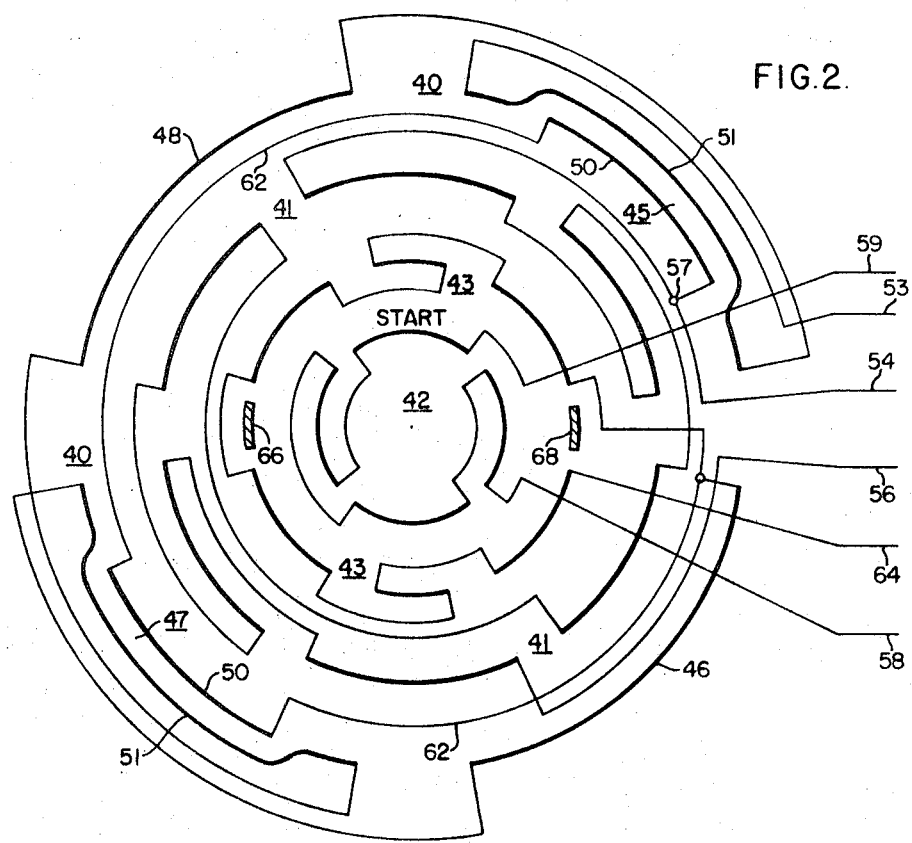
FIG. 2 is a connection diagram of the windings shown in FIG. 1.

To energize the winding 40, a terminal lead 53 is connected to one end of the winding via its outer coil portion 51 in the first quandrant and a second (common) terminal lead 54 is connected to the other end of the winding 40 namely, the inner coil portion 50 in the first quandrant as depicted in FIG. 2.

Figure 3:
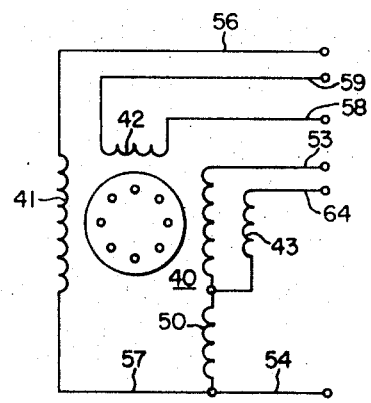
FIG. 3 is a simplified schematic representation of the windings shown in FIG. 2.

The next winding 41 is a secondary primary winding having a number of concentric coils different from that of the primary winding 40. The coils of the winding 41 are disposed in the core slots to form a corresponding number of poles for a second running speed. The second primary winding is shown as a conventional six pole winding with six coils connected together to form poles with alternating polarity as shown in FIG. 2. A terminal lead 56 is connected to one end of the winding 41, the other end of the winding being connected to the common terminal lead 54 at a common junction 57 as shown in FIGS. 2 and 3.

The winding 42 is an auxiliary or start winding having coils disposed in the core slots to obtain the necessary circumferential displacement from the other windings to effect machine starting. The winding 42 is provided with terminal leads 58 and 59 to apply a starting potential thereto.

In accordance with the invention, the winding 43 is a third primary winding having concentric coils symmetrically disposed in the core slots to provide a third group of magnetic poles for a third running speed. In the embodiment of the invention shown, the winding 43 is a six pole winding which ordinarily would provide a six pole running speed like that of the six pole winding 41. The winding 43, however, is connected in electrical series with the inner portions 50 of the four pole winding 40, by connecting leads 61 and 62, shown in FIG. 2, so that when the eight pole winding 43 is energized, the inner windings of the four pole groups are also energized, the two windings 43 and 50 inducing in the core 38 two additional or consequent magnetic poles 66 and 68 as shown in FIG. 2. The winding 43 is connected (FIG. 2) to produce alternate poles in the upper and lower portions thereof so that the like poles exist adjacent the area occupied by the consequent poles 66 and 68. In this manner, the magnetic lines of force of the like poles converse in said area to form the consequent poles 66 and 68 with the assistance of the winding 50.

As shown, the induced poles 66 and 68 are oppositely and symmetrically disposed in circumferential alignment with the six pole groups formed by the eight pole winding 43. In this manner, an eight pole running speed is provided with only a six pole winding and this is accomplished in an efficient and economical manner since a substantial amount of the four-pole wide comprising the four pole winding 40 is employed for eight pole operation. This in turn requires fewer turns of wire for the eight pole winding 43 thereby facilitating the use of existing two-speed cores, with their limited amount of slot space, for the winding 43 and thus a third running speed.

Further economics are involved with the present invention without sacrifice of machine performance. For example, there is saving of wire with the use of a portion of the four pole winding 40 for eight pole operation, and the eight pole winding 43 can be inserted in the core 38 by already existing automatic inserting machinery since the coils of eight pole winding are symmetrically located on the core.

To start the motor using the windings of the invention as described, the start winding 42 and one of the primary windings may be energized through operation of a suitable speed selector switch and a suitable starting switch (not shown) which selectively apply single phase power to said windings through their associated terminal leads. If the switches are connected to always begin motor operation at its highest running speed, i.e., the speed provided by the four pole primary winding 40, power is applied through the terminal leads 53 and 54, and through leads 58 and 59 for the start winding 42. After the rotor of the motor attains a predetermined speed, the starting switch functions to open the circuit of the start winding.

To change the running speed of the motor to an intermediate slower speed, as provided by the six pole winding 41, power is removed from the lead 53, and thus the four pole winding 40, and applied to the six pole winding through terminal leads 56 and 54.

In a similar manner, when the third, lower running speed is desired, power is removed from the lead 56 of the six pole winding 41 and applied to the lead 64 of the eight pole winding 43.

It should now be apparent from the foregoing description that a new and useful three-speed winding arrangement for a three-speed motor has been provided in an unobvious manner. That is, three windings for three running speeds have been arranged in such a manner that existing two-speed stator laminations can be used for three-speed operation thereby effecting a plurality of economies heretofore unavailable including the use of such laminations for three-speed operation. This is accomplished by using a portion of a high-speed winding in combination with the third, low-speed winding to induce two additional poles for the third speed operation thereby reducing the actual number of pole coils for the third-speed operation.

Although only one embodiment of the invention has been shown, namely, a four, six and eight-pole winding, it will be obvious to those skilled in the art that the invention is not so limited, but is susceptible to three speed operation involving a number of poles different from that shown as well as various other changes without departing from the spirit and scope of the invention.

We claim:
1. A multi-speed, single-phase motor having at least three primary windings effective to form three groups of running magnetic poles when energized,
    the first primary winding having coincidentally disposed inner and outer coil portions with one of said coil portions being serially connected to the third primary winding,
    said portions and the third winding disposed to provide consequent poles,
    said consequent poles forming a portion of the third group of running poles.

2. The motor recited in claim 1 in which the second and third groups of running poles are formed by an equal number of coil groups.

3. The motor recited in claim 1 in which the three primary windings form four, six and eight pole groups, the four and six pole groups having a corresponding number of coils, and said eight pole group having only six coils.

4. In a dynamoelectric machine for operation at more than one speed,
    a magnetic core having a plurality of slots containing at least three main windings,
    said three main windings comprising:
        a first main winding disposed in predetermined ones of said slots to selectively form a first number of running magnetic poles effective to provide machine operation at a first speed,
        a second main winding disposed in predetermined ones of said slots to form a second number of running magnetic poles in excess of said first number of running poles to provide machine operation at a second speed,
        a third main winding disposed in predetermined ones of said slots to form a third number of running magnetic poles in excess of said second number of poles to provide machine operation at a third speed, and
    predetermined ones of said windings forming said first number of poles being further disposed in the magnetic core slots and electrically connected to conduct current in aiding relationship with said windings forming said third number of poles to induce in said magnetic core consequent magnetic poles which form a portion of said third number of running poles.

5. The machine recited in claim 4 in which the windings forming the second and third number of running poles are equal in number.

6. The machine recited in claim 3 in which the windings forming the first, second and third number of running poles are divided equally between two halves of the magnetic core with the consequent poles being formed in diametrically opposed positions in the core between the divided windings and poles.

References Cited

UNITED STATES PATENTS

| 2,999,954 | 9/1961 | Levy | 310—166 |
| 3,042,821 | 7/1962 | Stoll | 310—166 |
| 3,167,700 | 1/1965 | Neyhouse | 318—224 |

WARREN E. RAY, Primary Examiner

U.S. Cl. X.R.
310—185, 198, 202